US010094581B2

(12) United States Patent
Staniforth et al.

(10) Patent No.: US 10,094,581 B2
(45) Date of Patent: *Oct. 9, 2018

(54) FAN ASSEMBLY

(71) Applicant: Dyson Technology Limited, Wiltshire (GB)

(72) Inventors: Mark Joseph Staniforth, Bristol (GB); Jude Paul Pullen, London (GB)

(73) Assignee: Dyson Technology Limited, Malmesbury, Wiltshire (GB)

( * ) Notice: Subject to any disclaimer, the term of this patent is extended or adjusted under 35 U.S.C. 154(b) by 258 days.

This patent is subject to a terminal disclaimer.

(21) Appl. No.: 15/018,750

(22) Filed: Feb. 8, 2016

(65) Prior Publication Data
US 2016/0153673 A1 Jun. 2, 2016

Related U.S. Application Data

(63) Continuation of application No. 13/559,142, filed on Jul. 26, 2012, now Pat. No. 9,291,361.

(30) Foreign Application Priority Data

Jul. 27, 2011 (GB) .................................... 1112911.1

(51) Int. Cl.
*F24F 6/14* (2006.01)
*F04D 25/08* (2006.01)
(Continued)

(52) U.S. Cl.
CPC ................ *F24F 6/14* (2013.01); *F04D 25/08* (2013.01); *F04D 29/705* (2013.01); *F04F 5/16* (2013.01);
(Continued)

(58) Field of Classification Search
CPC ..... F04F 5/16; F04F 5/46; F04F 5/466; B60H 1/3202; F24F 6/14; F24F 1/01;
(Continued)

(56) References Cited

U.S. PATENT DOCUMENTS

| 284,962 A | 9/1883 | Huston |
| 1,357,261 A | 11/1920 | Svoboda |

(Continued)

FOREIGN PATENT DOCUMENTS

| BE | 560119 | 8/1957 |
| CA | 1055344 | 5/1979 |

(Continued)

OTHER PUBLICATIONS

Search Report dated Oct. 13, 2011, directed to GB Application No. 1112911.1; 2 pages.

(Continued)

*Primary Examiner* — Kenneth J Hansen
(74) *Attorney, Agent, or Firm* — Morrison & Foerster LLP

(57) ABSTRACT

A fan assembly includes a nozzle and a body on which the nozzle is mounted. The nozzle has a rear section having at least one first air inlet, at least one first air outlet, and a first interior passage for conveying air from the at least one first air inlet to the at least one first air outlet; and a front section having at least one second air inlet, at least one second air outlet, and a second interior passage for conveying air from the at least one second air inlet to the at least one second air outlet. A first air flow through the first interior passage and a second air flow through the second interior passage are each generated within the body. At least one of the temperature, humidity, and electrical charge of the second air flow is changed before it enters the second interior passage.

14 Claims, 8 Drawing Sheets

(51) Int. Cl.
  *F04F 5/16* (2006.01)
  *F24F 1/01* (2011.01)
  *F24F 13/26* (2006.01)
  *F04D 29/70* (2006.01)
  *F24F 6/00* (2006.01)
  *F24F 6/12* (2006.01)

(52) U.S. Cl.
  CPC .............. *F24F 1/01* (2013.01); *F24F 13/26* (2013.01); *F24F 2006/008* (2013.01); *F24F 2006/125* (2013.01); *F24F 2006/143* (2013.01); *F24F 2221/28* (2013.01); *Y02B 30/545* (2013.01); *Y02B 30/80* (2013.01)

(58) Field of Classification Search
  CPC .. F24F 13/26; F24F 2221/28; F24F 2006/008; F04D 29/705; F04D 25/08
  See application file for complete search history.

(56) References Cited

U.S. PATENT DOCUMENTS

| | | |
|---|---|---|
| 1,767,060 A | 6/1930 | Ferguson |
| 1,896,869 A | 2/1933 | Larsh |
| 2,014,185 A | 9/1935 | Martin |
| 2,035,733 A | 3/1936 | Wall |
| 2,071,266 A | 2/1937 | Schmidt |
| D103,476 S | 3/1937 | Weber |
| 2,115,883 A | 5/1938 | Sher |
| D115,344 S | 6/1939 | Chapman |
| 2,210,458 A | 8/1940 | Keilholtz |
| 2,258,961 A | 10/1941 | Saathoff |
| 2,295,502 A | 9/1942 | Lamb |
| 2,336,295 A | 12/1943 | Reimuller |
| 2,363,839 A | 11/1944 | Demuth |
| 2,433,795 A | 12/1947 | Stokes |
| 2,473,325 A | 6/1949 | Aufiero |
| 2,476,002 A | 7/1949 | Stalker |
| 2,488,467 A | 11/1949 | De Lisio |
| 2,510,132 A | 6/1950 | Morrison |
| 2,544,379 A | 3/1951 | Davenport |
| 2,547,448 A | 4/1951 | Demuth |
| 2,583,374 A | 1/1952 | Hoffman |
| 2,620,127 A | 12/1952 | Radcliffe |
| 2,711,682 A | 6/1955 | Drechsel |
| 2,765,977 A | 10/1956 | Morrison |
| 2,808,198 A | 10/1957 | Morrison |
| 2,813,673 A | 11/1957 | Smith |
| 2,830,779 A | 4/1958 | Wentling |
| 2,838,229 A | 6/1958 | Belanger |
| 2,922,277 A | 1/1960 | Bertin |
| 2,922,570 A | 1/1960 | Allen |
| 3,004,403 A | 10/1961 | Laporte |
| 3,047,208 A | 7/1962 | Coanda |
| 3,185,448 A | 5/1965 | Fraser et al. |
| 3,270,655 A | 9/1966 | Guirl et al. |
| D206,973 S | 2/1967 | De Lisio |
| 3,503,138 A | 3/1970 | Fuchs et al. |
| 3,518,776 A | 7/1970 | Wolff et al. |
| 3,724,092 A | 4/1973 | McCleerey |
| 3,729,934 A | 5/1973 | Denning et al. |
| 3,743,186 A | 7/1973 | Mocarski |
| 3,795,367 A | 3/1974 | Mocarski |
| 3,872,916 A | 3/1975 | Beck |
| 3,875,745 A | 4/1975 | Franklin |
| 3,885,891 A | 5/1975 | Throndson |
| 3,943,329 A | 3/1976 | Hlavac |
| 4,037,991 A | 7/1977 | Taylor |
| 4,046,492 A | 9/1977 | Inglis |
| 4,061,188 A | 12/1977 | Beck |
| 4,073,613 A | 2/1978 | Desty |
| 4,090,814 A | 5/1978 | Teodorescu et al. |
| 4,113,416 A | 9/1978 | Kataoka et al. |
| 4,136,735 A | 1/1979 | Beck et al. |
| 4,173,995 A | 11/1979 | Beck |
| 4,180,130 A | 12/1979 | Beck et al. |
| 4,184,417 A | 1/1980 | Chancellor |
| 4,184,541 A | 1/1980 | Beck et al. |
| 4,192,461 A | 3/1980 | Arborg |
| 4,221,331 A | 9/1980 | Goran, Jr. |
| 4,332,529 A | 6/1982 | Alperin |
| 4,336,017 A | 6/1982 | Desty |
| 4,342,204 A | 8/1982 | Melikian et al. |
| 4,448,354 A | 5/1984 | Reznick et al. |
| 4,568,243 A | 2/1986 | Schubert et al. |
| 4,630,475 A | 12/1986 | Mizoguchi |
| 4,634,050 A | 1/1987 | Shippee |
| 4,643,351 A | 2/1987 | Fukamachi et al. |
| 4,657,178 A * | 4/1987 | Meckler ................ F24F 1/01 236/13 |
| 4,703,152 A | 10/1987 | Shih-Chin |
| 4,716,946 A | 1/1988 | Grigoletto |
| 4,718,870 A | 1/1988 | Watts |
| 4,732,539 A | 3/1988 | Shin-Chin |
| 4,734,017 A | 3/1988 | Levin |
| 4,790,133 A | 12/1988 | Stuart |
| 4,850,804 A | 7/1989 | Huang |
| 4,878,620 A | 11/1989 | Tarleton |
| 4,893,990 A | 1/1990 | Tomohiro et al. |
| 4,978,281 A | 12/1990 | Conger |
| 5,061,405 A | 10/1991 | Stanek et al. |
| D325,435 S | 4/1992 | Coup et al. |
| 5,110,266 A | 5/1992 | Toyoshima et al. |
| 5,168,722 A | 12/1992 | Brock |
| 5,176,856 A | 1/1993 | Takahashi et al. |
| 5,188,508 A | 2/1993 | Scott et al. |
| 5,296,769 A | 3/1994 | Havens et al. |
| 5,310,313 A | 5/1994 | Chen |
| 5,317,815 A | 6/1994 | Hwang |
| 5,322,218 A | 6/1994 | Melbourne |
| 5,338,495 A | 8/1994 | Steiner et al. |
| 5,402,938 A | 4/1995 | Sweeney |
| 5,407,324 A | 4/1995 | Starnes, Jr. et al. |
| 5,425,902 A * | 6/1995 | Miller .................. B01J 19/32 261/128 |
| 5,435,489 A | 7/1995 | Jenkins et al. |
| 5,483,616 A | 1/1996 | Chiu et al. |
| 5,518,370 A | 5/1996 | Wang et al. |
| 5,609,473 A | 3/1997 | Litvin |
| 5,645,769 A | 7/1997 | Tamaru et al. |
| 5,649,370 A | 7/1997 | Russo |
| 5,671,321 A | 9/1997 | Bagnuolo |
| 5,677,982 A | 10/1997 | Levine et al. |
| 5,735,683 A | 4/1998 | Muschelknautz |
| 5,762,034 A | 6/1998 | Foss |
| 5,762,661 A | 6/1998 | Kleinberger et al. |
| 5,783,117 A | 7/1998 | Byassee et al. |
| 5,794,306 A | 8/1998 | Firdaus |
| D398,983 S | 9/1998 | Keller et al. |
| 5,841,080 A | 11/1998 | Iida et al. |
| 5,843,344 A | 12/1998 | Junket et al. |
| 5,859,952 A | 1/1999 | Levine et al. |
| 5,862,037 A | 1/1999 | Behl |
| 5,868,197 A | 2/1999 | Potier |
| 5,881,685 A | 3/1999 | Foss et al. |
| D415,271 S | 10/1999 | Feer |
| 6,015,274 A | 1/2000 | Bias et al. |
| 6,073,881 A | 6/2000 | Chen |
| D429,808 S | 8/2000 | Krauss et al. |
| 6,123,618 A | 9/2000 | Day |
| 6,155,782 A | 12/2000 | Hsu |
| D435,899 S | 1/2001 | Melwani |
| 6,254,337 B1 | 7/2001 | Arnold |
| 6,269,549 B1 | 8/2001 | Carlucci et al. |
| 6,278,248 B1 | 8/2001 | Hong et al. |
| 6,282,746 B1 | 9/2001 | Schleeter |
| 6,293,121 B1 | 9/2001 | Labrador |
| 6,321,034 B2 | 11/2001 | Jones-Lawlor et al. |
| 6,386,845 B1 | 5/2002 | Bedard |
| 6,480,672 B1 | 11/2002 | Rosenzweig et al. |
| 6,599,088 B2 | 7/2003 | Stagg |
| 6,604,694 B1 | 8/2003 | Kordas et al. |
| D485,895 S | 1/2004 | Melwani |
| 6,789,787 B2 | 9/2004 | Stutts |

(56) References Cited

U.S. PATENT DOCUMENTS

| | | |
|---|---|---|
| 6,791,056 B2 | 9/2004 | VanOtteren et al. |
| 6,830,433 B2 | 12/2004 | Birdsell et al. |
| 6,845,971 B2 | 1/2005 | Bachert |
| 7,059,826 B2 | 6/2006 | Lasko |
| 7,088,913 B1 | 8/2006 | Verhoorn et al. |
| 7,147,336 B1 | 12/2006 | Chou |
| D539,414 S | 3/2007 | Russak et al. |
| 7,192,258 B2 | 3/2007 | Kuo et al. |
| 7,198,473 B2 | 4/2007 | Stickland et al. |
| 7,412,781 B2 | 8/2008 | Mattinger et al. |
| 7,478,993 B2 | 1/2009 | Hong et al. |
| 7,540,474 B1 | 6/2009 | Huang et al. |
| D598,532 S | 8/2009 | Dyson et al. |
| D602,143 S | 10/2009 | Gammack et al. |
| D602,144 S | 10/2009 | Dyson et al. |
| D605,748 S | 12/2009 | Gammack et al. |
| 7,660,110 B2 | 2/2010 | Vinson et al. |
| 7,664,377 B2 | 2/2010 | Liao |
| D614,280 S | 4/2010 | Dyson et al. |
| 7,731,050 B2 | 6/2010 | Parks et al. |
| 7,775,848 B1 | 8/2010 | Auerbach |
| 7,806,388 B2 | 10/2010 | Junkel et al. |
| 7,841,045 B2 | 11/2010 | Shaanan et al. |
| 7,931,449 B2 | 4/2011 | Fitton et al. |
| 8,002,520 B2 | 8/2011 | Dawson et al. |
| 8,092,166 B2 | 1/2012 | Nicolas et al. |
| 8,113,490 B2 | 2/2012 | Chen |
| 8,152,495 B2 | 4/2012 | Boggess, Jr. et al. |
| 8,246,317 B2 | 8/2012 | Gammack |
| 8,308,445 B2 | 11/2012 | Gammack et al. |
| 8,348,629 B2 | 1/2013 | Fitton et al. |
| 8,356,804 B2 | 1/2013 | Fitton et al. |
| 8,454,322 B2 | 6/2013 | Gammack et al. |
| 8,529,226 B2 | 9/2013 | Li |
| 8,544,826 B2 | 10/2013 | Ediger et al. |
| 8,721,307 B2 | 5/2014 | Li |
| 9,127,855 B2 | 9/2015 | Staniforth et al. |
| 2002/0104972 A1 | 8/2002 | Guzorek |
| 2002/0106547 A1 | 8/2002 | Sugawara et al. |
| 2003/0059307 A1 | 3/2003 | Moreno et al. |
| 2003/0164367 A1 | 9/2003 | Bucher et al. |
| 2003/0171093 A1 | 9/2003 | Gumucio Del Pozo |
| 2003/0190183 A1 | 10/2003 | Hsing |
| 2004/0022631 A1 | 2/2004 | Birdsell et al. |
| 2004/0049842 A1 | 3/2004 | Prehodka |
| 2004/0106370 A1 | 6/2004 | Honda et al. |
| 2004/0149881 A1 | 8/2004 | Allen |
| 2005/0031448 A1 | 2/2005 | Lasko et al. |
| 2005/0053465 A1 | 3/2005 | Roach et al. |
| 2005/0069407 A1 | 3/2005 | Winkler et al. |
| 2005/0128698 A1 | 6/2005 | Huang |
| 2005/0163670 A1 | 7/2005 | Alleyne et al. |
| 2005/0173997 A1 | 8/2005 | Schmid et al. |
| 2005/0281672 A1 | 12/2005 | Parker et al. |
| 2006/0172682 A1 | 8/2006 | Orr et al. |
| 2006/0199515 A1 | 9/2006 | Lasko et al. |
| 2006/0263073 A1 | 11/2006 | Clarke et al. |
| 2006/0279927 A1 | 12/2006 | Strohm |
| 2007/0035189 A1 | 2/2007 | Matsumoto |
| 2007/0041857 A1 | 2/2007 | Fleig |
| 2007/0065280 A1 | 3/2007 | Fok |
| 2007/0166160 A1 | 7/2007 | Russak et al. |
| 2007/0176502 A1 | 8/2007 | Kasai et al. |
| 2007/0224044 A1 | 9/2007 | Hong et al. |
| 2007/0237500 A1 | 10/2007 | Wang |
| 2007/0269323 A1 | 11/2007 | Zhou et al. |
| 2008/0020698 A1 | 1/2008 | Spaggiari |
| 2008/0124060 A1 | 5/2008 | Gao |
| 2008/0152482 A1 | 6/2008 | Patel |
| 2008/0166224 A1 | 7/2008 | Giffin |
| 2008/0286130 A1 | 11/2008 | Purvines |
| 2008/0314250 A1 | 12/2008 | Cowie et al. |
| 2009/0026850 A1 | 1/2009 | Fu |
| 2009/0032130 A1 | 2/2009 | Dumas et al. |
| 2009/0039805 A1 | 2/2009 | Tang |
| 2009/0060710 A1 | 3/2009 | Gammack et al. |
| 2009/0060711 A1 | 3/2009 | Gammack et al. |
| 2009/0078120 A1 | 3/2009 | Kummer et al. |
| 2009/0120925 A1 | 5/2009 | Lasko |
| 2009/0191054 A1 | 7/2009 | Winkler |
| 2009/0214341 A1 | 8/2009 | Craig |
| 2010/0133707 A1 | 6/2010 | Huang |
| 2010/0150699 A1 | 6/2010 | Nicolas et al. |
| 2010/0162011 A1 | 6/2010 | Min |
| 2010/0171465 A1 | 7/2010 | Seal et al. |
| 2010/0225012 A1 | 9/2010 | Fitton et al. |
| 2010/0226749 A1 | 9/2010 | Gammack et al. |
| 2010/0226750 A1 | 9/2010 | Gammack |
| 2010/0226751 A1 | 9/2010 | Gammack et al. |
| 2010/0226752 A1 | 9/2010 | Gammack et al. |
| 2010/0226753 A1 | 9/2010 | Dyson et al. |
| 2010/0226754 A1 | 9/2010 | Hutton et al. |
| 2010/0226758 A1 | 9/2010 | Cookson et al. |
| 2010/0226763 A1 | 9/2010 | Gammack et al. |
| 2010/0226764 A1 | 9/2010 | Gammack et al. |
| 2010/0226769 A1 | 9/2010 | Helps |
| 2010/0226771 A1 | 9/2010 | Crawford et al. |
| 2010/0226787 A1 | 9/2010 | Gammack et al. |
| 2010/0226797 A1 | 9/2010 | Fitton et al. |
| 2010/0226801 A1 | 9/2010 | Gammack |
| 2010/0254800 A1 | 10/2010 | Fitton et al. |
| 2011/0058935 A1 | 3/2011 | Gammack et al. |
| 2011/0110805 A1 | 5/2011 | Gammack et al. |
| 2011/0164959 A1 | 7/2011 | Fitton et al. |
| 2011/0223014 A1 | 9/2011 | Crawford et al. |
| 2011/0223015 A1 | 9/2011 | Gammack et al. |
| 2011/0259980 A1 | 10/2011 | Akisada et al. |
| 2012/0031509 A1 | 2/2012 | Wallace et al. |
| 2012/0033952 A1 | 2/2012 | Wallace et al. |
| 2012/0034108 A1 | 2/2012 | Wallace et al. |
| 2012/0039705 A1 | 2/2012 | Gammack |
| 2012/0045315 A1 | 2/2012 | Gammack |
| 2012/0045316 A1 | 2/2012 | Gammack |
| 2012/0057959 A1 | 3/2012 | Hodgson et al. |
| 2012/0082561 A1 | 4/2012 | Gammack et al. |
| 2012/0093629 A1 | 4/2012 | Fitton et al. |
| 2012/0093630 A1 | 4/2012 | Fitton et al. |
| 2012/0114513 A1 | 5/2012 | Simmonds et al. |
| 2012/0230658 A1 | 9/2012 | Fitton et al. |
| 2012/0308375 A1 | 12/2012 | Gammack |
| 2013/0026664 A1 | 1/2013 | Staniforth et al. |
| 2013/0028766 A1 | 1/2013 | Staniforth et al. |
| 2013/0129490 A1 | 5/2013 | Dos Reis et al. |
| 2013/0161842 A1 | 6/2013 | Fitton et al. |
| 2013/0199372 A1 | 8/2013 | Nock et al. |
| 2013/0234346 A1 | 9/2013 | Staniforth et al. |
| 2013/0234347 A1 | 9/2013 | Staniforth et al. |
| 2013/0249122 A1 | 9/2013 | Staniforth et al. |
| 2013/0249124 A1 | 9/2013 | Staniforth et al. |
| 2013/0249126 A1 | 9/2013 | Staniforth et al. |
| 2013/0272858 A1 | 10/2013 | Stickney et al. |
| 2013/0280051 A1 | 10/2013 | Nicolas et al. |
| 2013/0280061 A1 | 10/2013 | Stickney |
| 2013/0280096 A1 | 10/2013 | Gammack et al. |
| 2013/0323100 A1 | 12/2013 | Poulton et al. |
| 2014/0077398 A1 | 3/2014 | Staniforth et al. |
| 2014/0079566 A1 | 3/2014 | Gammack et al. |
| 2014/0084492 A1 | 3/2014 | Staniforth et al. |
| 2014/0210114 A1 | 7/2014 | Staniforth et al. |
| 2014/0210115 A1 | 7/2014 | Staniforth et al. |
| 2014/0255173 A1 | 9/2014 | Poulton et al. |
| 2014/0255217 A1 | 9/2014 | Li |
| 2015/0338113 A1 | 11/2015 | Staniforth et al. |

FOREIGN PATENT DOCUMENTS

| | | |
|---|---|---|
| CA | 2155482 | 9/1996 |
| CH | 346643 | 5/1960 |
| CN | 2085866 | 10/1991 |
| CN | 2111392 | 7/1992 |
| CN | 2549372 | 5/2003 |
| CN | 1437300 | 8/2003 |
| CN | 2650005 | 10/2004 |
| CN | 2713643 | 7/2005 |

(56) References Cited

FOREIGN PATENT DOCUMENTS

| | | |
|---|---|---|
| CN | 1680727 | 10/2005 |
| CN | 2833197 | 11/2006 |
| CN | 201011346 | 1/2008 |
| CN | 201147215 | 11/2008 |
| CN | 201180678 | 1/2009 |
| CN | 201221477 | 4/2009 |
| CN | 101424279 | 5/2009 |
| CN | 101451754 | 6/2009 |
| CN | 201281416 | 7/2009 |
| CN | 201349269 | 11/2009 |
| CN | 101684828 | 3/2010 |
| CN | 201486901 | 5/2010 |
| CN | 101749288 | 6/2010 |
| CN | 201502549 | 6/2010 |
| CN | 201507461 | 6/2010 |
| CN | 101825096 | 9/2010 |
| CN | 101825101 | 9/2010 |
| CN | 101825102 | 9/2010 |
| CN | 101825103 | 9/2010 |
| CN | 101825104 | 9/2010 |
| CN | 201568337 | 9/2010 |
| CN | 101858355 | 10/2010 |
| CN | 101936310 | 1/2011 |
| CN | 201696365 | 1/2011 |
| CN | 201696366 | 1/2011 |
| CN | 201739199 | 2/2011 |
| CN | 101984299 | 3/2011 |
| CN | 101985948 | 3/2011 |
| CN | 201763705 | 3/2011 |
| CN | 201763706 | 3/2011 |
| CN | 201770513 | 3/2011 |
| CN | 201771875 | 3/2011 |
| CN | 201779080 | 3/2011 |
| CN | 201786777 | 4/2011 |
| CN | 201786778 | 4/2011 |
| CN | 201802648 | 4/2011 |
| CN | 102095236 | 6/2011 |
| CN | 201858204 | 6/2011 |
| CN | 201874898 | 6/2011 |
| CN | 201874901 | 6/2011 |
| CN | 201917047 | 8/2011 |
| CN | 102251973 | 11/2011 |
| CN | 102287357 | 12/2011 |
| CN | 102367813 | 3/2012 |
| CN | 202267207 | 6/2012 |
| CN | 202431623 | 9/2012 |
| DE | 1 291 090 | 3/1969 |
| DE | 24 51 557 | 5/1976 |
| DE | 27 48 724 | 5/1978 |
| DE | 3644567 | 7/1988 |
| DE | 195 10 397 | 9/1996 |
| DE | 197 12 228 | 10/1998 |
| DE | 100 00 400 | 3/2001 |
| DE | 10041805 | 6/2002 |
| DE | 10 2009 007 037 | 8/2010 |
| EP | 0 044 494 | 1/1982 |
| EP | 0 186 581 | 7/1986 |
| EP | 0 459 812 | 12/1991 |
| EP | 0 784 947 | 7/1997 |
| EP | 1 094 224 | 4/2001 |
| EP | 1 138 954 | 10/2001 |
| EP | 1 357 296 | 10/2003 |
| EP | 1 779 745 | 5/2007 |
| EP | 1 939 456 | 7/2008 |
| EP | 1 980 432 | 10/2008 |
| EP | 2 000 675 | 12/2008 |
| EP | 2 191 142 | 6/2010 |
| EP | 2 414 738 | 2/2012 |
| EP | 2 578 889 | 4/2013 |
| FR | 1033034 | 7/1953 |
| FR | 1119439 | 6/1956 |
| FR | 1387334 | 1/1965 |
| FR | 2 375 471 | 7/1978 |
| FR | 2 534 983 | 4/1984 |
| FR | 2 640 857 | 6/1990 |
| FR | 2 658 593 | 8/1991 |
| FR | 2794195 | 12/2000 |
| FR | 2 874 409 | 2/2006 |
| FR | 2 906 980 | 4/2008 |
| FR | 2928706 | 9/2009 |
| GB | 22235 | 6/1914 |
| GB | 383498 | 11/1932 |
| GB | 593828 | 10/1947 |
| GB | 601222 | 4/1948 |
| GB | 633273 | 12/1949 |
| GB | 641622 | 8/1950 |
| GB | 661747 | 11/1951 |
| GB | 863 124 | 3/1961 |
| GB | 1067956 | 5/1967 |
| GB | 1 262 131 | 2/1972 |
| GB | 1 265 341 | 3/1972 |
| GB | 1 278 606 | 6/1972 |
| GB | 1 304 560 | 1/1973 |
| GB | 1 403 188 | 8/1975 |
| GB | 1 434 226 | 5/1976 |
| GB | 1 501 473 | 2/1978 |
| GB | 2 094 400 | 9/1982 |
| GB | 2 107 787 | 5/1983 |
| GB | 2 111 125 | 6/1983 |
| GB | 2 178 256 | 2/1987 |
| GB | 2 185 531 | 7/1987 |
| GB | 2 185 533 | 7/1987 |
| GB | 2 218 196 | 11/1989 |
| GB | 2 236 804 | 4/1991 |
| GB | 2 240 268 | 7/1991 |
| GB | 2 242 935 | 10/1991 |
| GB | 2 285 504 | 7/1995 |
| GB | 2 289 087 | 11/1995 |
| GB | 2383277 | 6/2003 |
| GB | 2 428 569 | 2/2007 |
| GB | 2 452 593 | 3/2009 |
| GB | 2452490 | 3/2009 |
| GB | 2463698 | 3/2010 |
| GB | 2464736 | 4/2010 |
| GB | 2466058 | 6/2010 |
| GB | 2468312 | 9/2010 |
| GB | 2468313 | 9/2010 |
| GB | 2468315 | 9/2010 |
| GB | 2468317 | 9/2010 |
| GB | 2468319 | 9/2010 |
| GB | 2468320 | 9/2010 |
| GB | 2468323 | 9/2010 |
| GB | 2468328 | 9/2010 |
| GB | 2468329 | 9/2010 |
| GB | 2468331 | 9/2010 |
| GB | 2468369 | 9/2010 |
| GB | 2468498 | 9/2010 |
| GB | 2473037 | 3/2011 |
| GB | 2479760 | 10/2011 |
| GB | 2482547 | 2/2012 |
| GB | 2484671 | 4/2012 |
| GB | 2484695 | 4/2012 |
| GB | 2484761 | 4/2012 |
| GB | 2493231 | 1/2013 |
| GB | 2493505 | 2/2013 |
| GB | 2493507 | 2/2013 |
| GB | 2500011 | 9/2013 |
| JP | 31-13055 | 8/1956 |
| JP | 35-4369 | 3/1960 |
| JP | 39-7297 | 3/1964 |
| JP | 46-7230 | 12/1971 |
| JP | 47-21718 | 10/1972 |
| JP | 49-43764 | 4/1974 |
| JP | 49-150403 | 12/1974 |
| JP | 51-7258 | 1/1976 |
| JP | 52-121045 | 9/1977 |
| JP | 53-60100 | 5/1978 |
| JP | 56-167897 | 12/1981 |
| JP | 57-71000 | 5/1982 |
| JP | 57-157097 | 9/1982 |
| JP | 61-31830 | 2/1986 |
| JP | 61-116093 | 6/1986 |
| JP | 61-280787 | 12/1986 |
| JP | 62-98099 | 5/1987 |

(56) References Cited

FOREIGN PATENT DOCUMENTS

| | | |
|---|---|---|
| JP | 62-223494 | 10/1987 |
| JP | 63-36794 | 3/1988 |
| JP | 63-179198 | 7/1988 |
| JP | 63-198933 | 12/1988 |
| JP | 63-306340 | 12/1988 |
| JP | 64-21300 | 2/1989 |
| JP | 64-58955 | 3/1989 |
| JP | 64-83884 | 3/1989 |
| JP | 1-138399 | 5/1989 |
| JP | 1-224598 | 9/1989 |
| JP | 2-146294 | 6/1990 |
| JP | 2-218890 | 8/1990 |
| JP | 2-248690 | 10/1990 |
| JP | 3-52515 | 5/1991 |
| JP | 3-267598 | 11/1991 |
| JP | 3-286775 | 12/1991 |
| JP | 4-43895 | 2/1992 |
| JP | 4-366330 | 12/1992 |
| JP | 5-99386 | 4/1993 |
| JP | 5-157093 | 6/1993 |
| JP | 5-164089 | 6/1993 |
| JP | 5-263786 | 10/1993 |
| JP | 6-74190 | 3/1994 |
| JP | 6-86898 | 3/1994 |
| JP | 6-147188 | 5/1994 |
| JP | 6-257591 | 9/1994 |
| JP | 6-280800 | 10/1994 |
| JP | 6-336113 | 12/1994 |
| JP | 7-190443 | 7/1995 |
| JP | 8-21400 | 1/1996 |
| JP | 8-72525 | 3/1996 |
| JP | 8-313019 | 11/1996 |
| JP | 9-86154 | 3/1997 |
| JP | 9-100800 | 4/1997 |
| JP | 9-178083 | 7/1997 |
| JP | 9-287600 | 11/1997 |
| JP | 11-502586 | 3/1999 |
| JP | 11-227866 | 8/1999 |
| JP | 2000-55419 | 2/2000 |
| JP | 2000-116179 | 4/2000 |
| JP | 2000-201723 | 7/2000 |
| JP | 2001-17358 | 1/2001 |
| JP | 2002-21797 | 1/2002 |
| JP | 2002-138829 | 5/2002 |
| JP | 2002-213388 | 7/2002 |
| JP | 2003-4265 | 1/2003 |
| JP | 2003-329273 | 11/2003 |
| JP | 2004-8275 | 1/2004 |
| JP | 2004-208935 | 7/2004 |
| JP | 2004-216221 | 8/2004 |
| JP | 2005-201507 | 7/2005 |
| JP | 2005-307985 | 11/2005 |
| JP | 2006-89096 | 4/2006 |
| JP | 2006-189221 | 7/2006 |
| JP | 3127331 | 11/2006 |
| JP | 3129024 | 2/2007 |
| JP | 2007-138763 | 6/2007 |
| JP | 2007-138789 | 6/2007 |
| JP | 2008-37247 | 2/2008 |
| JP | 2008-39316 | 2/2008 |
| JP | 2008-100204 | 5/2008 |
| JP | 3144127 | 8/2008 |
| JP | 3146538 | 10/2008 |
| JP | 2008-294243 | 12/2008 |
| JP | 2009-41835 | 2/2009 |
| JP | 2009-44568 | 2/2009 |
| JP | 2009-62986 | 3/2009 |
| JP | 2009-275925 | 11/2009 |
| JP | 2010-46411 | 3/2010 |
| JP | 2010-131259 | 6/2010 |
| JP | 2010-203760 | 9/2010 |
| JP | 2010-203764 | 9/2010 |
| JP | 2012-31806 | 2/2012 |
| KR | 1999-002660 | 1/1999 |
| KR | 10-2005-0102317 | 10/2005 |
| KR | 10-2007-0007997 | 1/2007 |
| KR | 20-0448319 | 3/2010 |
| KR | 10-2010-0055611 | 5/2010 |
| KR | 10-0985378 | 9/2010 |
| TW | 517825 | 1/2003 |
| TW | 589932 | 6/2004 |
| TW | M331585 | 5/2008 |
| TW | M394383 | 12/2010 |
| TW | M399207 | 3/2011 |
| TW | M407299 | 7/2011 |
| WO | WO-90/13478 | 11/1990 |
| WO | WO-95/06822 | 3/1995 |
| WO | WO-02/073096 | 9/2002 |
| WO | WO-03/058795 | 7/2003 |
| WO | WO-03/069931 | 8/2003 |
| WO | WO-2005/050026 | 6/2005 |
| WO | WO-2005/057091 | 6/2005 |
| WO | WO-2006/008021 | 1/2006 |
| WO | WO-2006/012526 | 2/2006 |
| WO | WO-2007/024955 | 3/2007 |
| WO | WO-2007/048205 | 5/2007 |
| WO | WO-2008/014641 | 2/2008 |
| WO | WO-2008/024569 | 2/2008 |
| WO | WO-2008/139491 | 11/2008 |
| WO | WO-2009/030879 | 3/2009 |
| WO | WO-2009/030881 | 3/2009 |
| WO | WO-2010/100449 | 9/2010 |
| WO | WO-2010/100451 | 9/2010 |
| WO | WO-2010/100452 | 9/2010 |
| WO | WO-2010/100453 | 9/2010 |
| WO | WO-2010/100462 | 9/2010 |
| WO | WO-2011/050041 | 4/2011 |
| WO | WO-2011/147318 | 12/2011 |
| WO | WO-2012/006882 | 1/2012 |
| WO | WO-2012/033517 | 3/2012 |
| WO | WO-2012/052737 | 4/2012 |
| WO | WO-2013/014419 | 1/2013 |
| WO | WO-2013/132218 | 9/2013 |

OTHER PUBLICATIONS

International Search Report and Written Opinion dated Nov. 2, 2012, directed to International Application No. PCT/GB2012/051488; 10 pages.

Reba, I. (1966). "Applications of the Coanda Effect," *Scientific American* 214:84-92.

Third Party Submission Under 37 CFR 1.99 filed Jun. 2, 2011, directed to U.S. Appl. No. 12/203,698; 3 pages.

Gammack et al., U.S. Office Action dated Dec. 9, 2010, directed to U.S. Appl. No. 12/203,698; 10 pages.

Gammack et al., U.S. Office Action dated Jun. 21, 2011, directed to U.S. Appl. No. 12/203,698; 11 pages.

Gammack et al., U.S. Office Action dated Sep. 17, 2012, directed to U.S. Appl. No. 13/114,707; 12 pages.

Gammack et al., U.S. Office Action dated Dec. 10, 2010, directed to U.S. Appl. No. 12/230,613; 12 pages.

Gammack et al., U.S. Office Action dated May 13, 2011, directed to U.S. Appl. No. 12/230,613; 13 pages.

Gammack et al., U.S. Office Action dated Sep. 7, 2011, directed to U.S. Appl. No. 12/230,613; 15 pages.

Gammack et al., U.S. Office Action dated Jun. 8, 2012, directed to U.S. Appl. No. 12/230,613; 15 pages.

Gammack et al., U.S. Office Action dated Aug. 20, 2012, directed to U.S. Appl. No. 12/945,558; 15 pages.

Gammack et al., U.S. Office Action dated Feb. 28, 2013, directed to U.S. Appl. No. 12/945,558; 16 pages.

Gammack et al., U.S. Office Action dated Jun. 12, 2013, directed to U.S. Appl. No. 12/945,558; 20 pages.

Fitton et al., U.S. Office Action dated Nov. 30, 2010 directed to U.S. Appl. No. 12/560,232; 9 pages.

Nicolas et al., U.S. Office Action dated Mar. 7, 2011, directed to U.S. Appl. No. 12/622,844; 10 pages.

Nicolas et al., U.S. Office Action dated Sep. 8, 2011, directed to U.S. Appl. No. 12/622,844; 11 pages.

(56) References Cited

OTHER PUBLICATIONS

Helps et al., U.S. Office Action dated Feb. 15, 2013, directed to U.S. Appl. No. 12/716,694; 12 pages.
Gammack et al., U.S. Office Action dated Dec. 9, 2010, directed to U.S. Appl. No. 12/716,781; 17 pages.
Gammack et al., U.S. Office Action dated Jun. 24, 2011, directed to U.S. Appl. No. 12/716,781; 19 pages.
Gammack et al., U.S. Office Action dated May 29, 2013, directed to U.S. Appl. No. 13/588,666; 11 pages.
Gammack et al., U.S. Office Action dated Sep. 27, 2013, directed to U.S. Appl. No. 13/588,666; 10 pages.
Gammack et al., U.S. Office Action dated Mar. 14, 2013, directed to U.S. Appl. No. 12/716,740; 15 pages.
Gammack et al., U.S. Office Action dated Sep. 6, 2013, directed to U.S. Appl. No. 12/716,740; 15 pages.
Gammack et al., U.S. Office Action dated Apr. 24, 2014, directed to U.S. Appl. No. 12/716,740; 16 pages.
Li, U.S. Office Action dated Oct. 25, 2013, directed to U.S. Appl. No. 13/686,480; 17 pages.
Fitton et al., U.S. Office Action dated Jun. 13, 2014, directed to U.S. Appl. No. 13/274,998; 11 pages.
Fitton et al., U.S. Office Action dated Jun. 13, 2014, directed to U.S. Appl. No. 13/275,034; 10 pages.
Gammack et al., U.S. Office Action dated Feb. 14, 2013, directed to U.S. Appl. No. 12/716,515; 21 pages.
Gammack et al., U.S. Office Action dated Aug. 19, 2013, directed to U.S. Appl. No. 12/716,515; 20 pages.
Gammack et al., U.S. Office Action dated Feb. 10, 2014, directed to U.S. Appl. No. 12/716,515; 21 pages.
Fitton et al., U.S. Office Action dated Mar. 30, 2012, directed to U.S. Appl. No. 12/716,707; 7 pages.
Fitton et al., U.S. Office Action dated Dec. 31, 2013, directed to U.S. Appl. No. 13/718,693; 8 pages.
Gammack et al. U.S. Office Action dated Oct. 18, 2012, directed to U.S. Appl. No. 12/917,247; 11 pages.
Gammack et al., U.S. Office Action dated Sep. 3, 2014, directed to U.S. Appl. No. 13/861,891; 7 pages.
Wallace et al., U.S. Office Action dated Jun. 7, 2013, directed to U.S. Appl. No. 13/192,223; 30 pages.
Wallace et al., U.S. Office Action dated Oct. 23, 2013, directed to U.S. Appl. No. 13/192,223; 18 pages.
Gammack et al., U.S. Office Action dated Apr. 12, 2011, directed to U.S. Appl. No. 12/716,749; 8 pages.
Gammack et al., U.S. Office Action dated Sep. 1, 2011, directed to U.S. Appl. No. 12/716,749; 9 pages.
Gammack et al., U.S. Office Action dated Jun. 25, 2012, directed to U.S. Appl. No. 12/716,749; 11 pages.
Gammack et al., U.S. Office Action dated May 24, 2011, directed to U.S. Appl. No. 12/716,613; 9 pages.
Fitton et al., U.S. Office Action dated Mar. 8, 2011, directed to U.S. Appl. No. 12/716,780; 12 pages.
Fitton et al., U.S. Office Action dated Sep. 6, 2011, directed to U.S. Appl. No. 12/716,780; 16 pages.
Staniforth et al., U.S. Office Action dated Sep. 18, 2014, directed to U.S. Appl. No. 13/559,142; 18 pages.
Staniforth et al., U.S. Office Action dated May 5, 2015, directed to U.S. Appl. No. 13/559,142; 18 pages.
Staniforth et al., U.S. Office Action dated Nov. 14, 2014, directed to U.S. Appl. No. 13/559,145; 9 pages.
Staniforth et al., U.S. Office Action dated Aug. 28, 2015, directed to U.S. Appl. No. 14/817,122; 6 pages.
Staniforth et al., U.S. Office Action dated Jun. 1, 2015, directed to U.S. Appl. No. 13/559,146; 23 pages.
Staniforth et al., U.S. Office Action dated Jan. 22, 2016, directed to U.S. Appl. No. 13/559,146; 20 pages.

\* cited by examiner

FAN ASSEMBLY

REFERENCE TO RELATED APPLICATIONS

This application is a continuation of U.S. patent application Ser. No. 13/559,142, filed Jul. 26, 2012, which claims the priority of United Kingdom Application No. 1112911.1, filed Jul. 27, 2011, the entire contents of which are incorporated herein by reference.

FIELD OF THE INVENTION

The present invention relates to a fan assembly. In a preferred embodiment, the present invention provides a humidifying apparatus for generating a flow of moist air and a flow of air for dispersing the moist air within a domestic environment, such as a room, office or the like. The invention may also be used to disperse a hot, cool, scented or ionized air flow within an environment.

BACKGROUND OF THE INVENTION

Domestic humidifying apparatus is generally in the form of a portable appliance having a casing comprising a water tank for storing a volume of water, and a fan for creating a flow of air through an air duct of the casing. The stored water is conveyed, usually under gravity, to an atomizing device for producing water droplets from the received water. This device may be in the form of high frequency vibrating device, such as a transducer. The water droplets enter the flow of air passing through the air duct, resulting in the emission of a mist into the environment. The appliance may include a sensor for detecting the relative humidity of the air in the environment. The sensor outputs a signal indicative of the detected relative humidity to a drive circuit, which controls the transducer to maintain the relative humidity of the air in the environment around a desired level. Typically, the actuation of the transducer is stopped when the detected relative humidity is around 5% higher than the desired level, and is restarted when the detected relative humidity is around 5% lower than the desired level.

The flow rate of the air emitted from such a humidifier tends to be relatively low, for example in the range from 1 to 2 liters per second, and so the rate at which the humid air is dispersed into a room can be very low. Furthermore, as the relative humidity of the air in the local environment of the humidifier will rise relatively rapidly in comparison to that of the air in the local environment of the user, the relative humidity detected by the sensor will not, at least initially, be indicative of the relative humidity of the air local to the user. As a result, the actuation of the transducer may be stopped when the relative humidity of the air in the local environment of the user is significantly below the desired level. Due to the relatively low rate at which the humid air is dispersed into the room, it can then take some time for the detected relative humidity to fall to a level at which the actuation of the transducer is restarted. Consequently, it may take a long period of time for the relative humidity of the air in the local environment of the user to reach the desired level.

WO 2010/100462 describes humidifying apparatus which comprises a humidifier for emitting moist air into the atmosphere, and, positioned in front of the humidifier, a fan assembly which comprises a body housing a motor-driven impeller for creating an air flow, and an annular nozzle mounted on the body which comprises an interior passage receiving the air flow and an air outlet for emitting the air flow. The nozzle defines a bore through which both air from outside the nozzle and the moist air emitted from the humidifier are drawn by the air flow emitted from the mouth. The outlet of the humidifier is located at the same level as the lowermost portion of the bore of the nozzle. Through the entrainment of the moist air emitted from the humidifier within an air current generated by the fan assembly, the moist air can be rapidly conveyed away from the humidifier to a distance of up to several meters. This can enable a user located at this distance from the humidifier to experience a rapid rise in the relative humidity of the air in the local environment.

SUMMARY OF THE INVENTION

In a first aspect, the present invention provides a fan assembly comprising a nozzle having a rear section having at least one first air inlet, at least one first air outlet, and a first interior passage for conveying air from said at least one first air inlet to said at least one first air outlet, and a front section having at least one second air inlet, at least one second air outlet, and a second interior passage which is preferably isolated from the first interior passage for conveying air from said at least one second air inlet to said at least one second air outlet, the sections of the nozzle defining a bore through which air from outside the fan assembly is drawn by air emitted from the nozzle, and a body on which the nozzle is mounted, the body comprising means for generating a first air flow through the first interior passage and a second air flow through the second interior passage, and means for changing one of the temperature, humidity, composition and electrical charge of the second air flow before it enters the second interior passage.

In an illustrated embodiment, the fan assembly includes a humidifier for humidifying the second air flow, but the fan assembly may alternatively comprise one of a heater, a chiller, an air purifier and an ionizer for changing another parameter of the second air flow.

A difference between the fan assembly of the present invention, when used to emit a humidified air current, and the humidifying apparatus described in WO 2010/100462 is that in the present invention, the nozzle of the fan assembly is arranged to emit both the moistened second air flow and the first air flow which carries the moistened air flow into the environment. In contrast, in WO 2010/100462 the moistened air flow is emitted from an outlet of the humidifying apparatus located behind the fan assembly, and entrained within a lower part of the air flow generated by the fan assembly. The present invention can thus allow the moistened air flow to be emitted from one or more different air outlets of the nozzle. These air outlets may be positioned, for example, about the bore of the nozzle to allow the moistened air flow to be dispersed relatively evenly within the first air flow. By locating the components that change the humidity of the second air flow within the body, the front section of the nozzle can have a relatively small size in comparison to the rear section of the nozzle. The present invention can thus allow the humidifying apparatus to have a compact appearance, a reduced number of components and therefore reduced manufacturing costs.

The body of the fan assembly may comprise a first air passageway for conveying the first air flow to the rear section of the nozzle and a second air passageway for conveying the second air flow to the front section of the nozzle. The means for changing the aforementioned parameter of the second air flow may therefore be located within the second air passageway.

The body may comprise an air flow inlet for admitting at least the first air flow into the fan assembly. The air flow inlet may comprise a single aperture, but it is preferred that the air flow inlet comprises a plurality of apertures. These apertures may be provided by a mesh, a grille or other molded component forming part of the external surface of the body.

The first air passageway preferably extends from the air flow inlet to the rear section of the nozzle. The second air passageway may be arranged to receive air directly from the air flow inlet. Alternatively, the second air passageway may be arranged to receive air from the first air passageway. In this case, the junction between the air passageways may be located downstream or upstream from the flow generating means. An advantage of locating the junction downstream from the flow generating means is that the flow generating means may comprise a single impeller and a motor for generating an air flow which is divided into the first and second air flows downstream from the impeller. An advantage of locating the junction upstream from the flow generating means is that the flow rate of the second air flow may be controlled to a value which is appropriate for the chosen means for changing the humidity or temperature of the second air flow. In this case, the flow generating means may comprise a first impeller and a first motor for driving the first impeller to generating an air flow through the air flow inlet, and a second impeller for generating the second air flow by drawing part of the generated air flow away from the first impeller. The second impeller may be driven by the first motor so that the first and second impellers are always rotated simultaneously. Preferably though, the fan assembly comprises a second motor for driving the second impeller. This allows the second impeller to be driven to generate the second air flow as and when it is required by the user, and so allows an air flow to emitted from the fan assembly solely through the rear section of the fan.

A common controller may be provided for controlling each motor. For example, the controller may be configured to actuate the second motor only if the first motor is currently actuated or if the second motor is actuated simultaneously with the first motor. The second motor may be deactivated automatically if the first motor is deactivated. The controller is thus preferably configured to allow the first motor to be activated separately from the second motor.

Preferably, the first air flow is emitted at a first air flow rate and the second air flow is emitted at a second air flow rate which is lower than the first air flow rate. The first air flow rate may be a variable air flow rate, whereas the second air flow rate may be a constant air flow rate. To generate these different air flows, the first impeller may be different from the second impeller. For example, the first impeller may be a mixed flow impeller or an axial impeller, and the second impeller may be a radial impeller. Alternatively, or additionally, the first impeller may be larger than the second impeller. The nature of the first and second motors may be selected depending on the chosen impeller and the maximum flow rate of the relative air flow.

The air passageways may be arranged within the body in any desired configuration depending on, inter alia, the location of the air flow inlet and the nature of the chosen means for changing the humidity or temperature of the second air flow. To reduce the size of the body, the first air passageway may be located adjacent the second air passageway. Each air passageway may extend vertically through the body, with the second air passageway extending vertically in front of the first air passageway.

The air outlet(s) of the rear section are preferably located behind the air outlet(s) of the front section so that the second air flow is conveyed away from the nozzle within the first air flow. Each section of the nozzle is preferably annular. Two sections of the nozzle may be provided by respective components of the nozzle, which may be connected together during assembly. Alternatively, the interior passages of the nozzle may be separated by a dividing wall or other partitioning member located between common inner and outer walls of the nozzle. As mentioned above, the first interior passage is preferably isolated from the second interior passage, but a relatively small amount of air may be bled from the first interior passage to the second interior passage to urge the second air flow through the air outlet(s) of the front section of the nozzle.

As the flow rate of the first air flow is preferably greater than the flow rate of the second air flow, the volume of the rear section of the nozzle is preferably greater than the volume of the front section of the nozzle.

The rear section of the nozzle may comprise a single continuous air outlet, which preferably extends about the bore of the nozzle, and is preferably centered on the axis of the bore. Alternatively, the rear section of the nozzle may comprise a plurality of air outlets which are arranged about the bore of the nozzle. For example, the air outlets of the rear section may be located on opposite sides of the bore. The air outlet(s) of the rear section are preferably arranged to emit air through at least a front part of the bore. This front part of the bore may be defined by at least the front section of the nozzle and may also be defined by part of the rear section of the nozzle. The air outlet(s) of the rear section may be arranged to emit air over a surface defining this front part of the bore to maximize the volume of air which is drawn through the bore by the air emitted from the rear section of the nozzle.

The air outlet(s) of the front section of the nozzle may be arranged to emit the first air flow over this surface of the nozzle. Alternatively, the air outlet(s) of the front section may be located in a front end of the nozzle, and arranged to emit air away from the surfaces of the nozzle. The front section may comprise a single continuous air outlet, which may extend about the front end of the nozzle. Alternatively, the front section may comprise a plurality of air outlets, which may be arranged about the front end of the nozzle. For example, the air outlets of the front section may be located on opposite sides of the front end of the nozzle. Each of the plurality of air outlets of the front section may comprise one or more apertures, for example, a slot, a plurality of linearly aligned slots, or a plurality of apertures.

In a preferred embodiment, the fan assembly comprises a humidifying system which is configured to increase the humidity of the second air flow before it is emitted from the nozzle. To provide the fan assembly with a compact appearance and with a reduced component number, at least part of the humidifying system may be located beneath the nozzle. At least part of the humidifying system may also be located beneath the first impeller and the first motor. For example, a transducer for atomizing water may be located beneath the nozzle. This transducer may be controlled by a controller that controls the second motor.

In a second aspect, the present invention provides humidifying apparatus comprising a nozzle having at least one first air inlet, at least one first air outlet, a first interior passage for conveying air from said at least one first air inlet to said at least one first air outlet, at least one second air inlet, at least one second air outlet, and a second interior passage which is preferably isolated from the first interior passage for conveying air from said at least one second air inlet to said at least one second air outlet, the nozzle defining a bore through which air from outside the fan assembly is drawn by air emitted from the nozzle, and a body on which the nozzle is mounted, the body comprising means for generating a first air flow through the first interior passage and a second air flow through the second interior passage, and humidifying means for humidifying the second air flow before it enters the second interior passage.

The body may comprise a removable water tank for supplying water to the humidifying means. The body may comprise a base comprising an air inlet and the air flow generating means, and the water tank may be mounted on the base. Preferably, the base and the water tank each have a curved outer surface, and the outer surfaces of the base and the water tank may have substantially the same radius. This can further contribute towards the compact appearance of the fan assembly.

In a third aspect, the present invention provides humidifying apparatus comprising a nozzle having at least one first air inlet, at least one first air outlet, a first interior passage for conveying air from said at least one first air inlet to said at least one first air outlet, at least one second air inlet, at least one second air outlet, and a second interior passage for conveying air from said at least one second air inlet to said at least one second air outlet, the nozzle defining a bore through which air from outside the fan assembly is drawn by air emitted from the air outlets, and a body on which the nozzle is mounted, the body comprising a base and a water tank mounted on the base, the base comprising flow generating means for generating a first air flow through the first interior passage and a second air flow through the second interior passage, a reservoir for receiving water from the water tank, a transducer for atomizing water located in the reservoir, a first air passageway for conveying the first air flow to said at least one first air inlet, and a second air passageway for conveying the second air flow over said reservoir and to said at least one second air inlet.

Features described above in connection with the first aspect of the invention are equally applicable to each of the second and third aspects of the invention, and vice versa.

BRIEF DESCRIPTION OF THE DRAWINGS

An embodiment of the present invention will now be described, by way of example only, with reference to the accompanying drawings, in which.

DETAILED DESCRIPTION OF THE INVENTION

Figure 1:
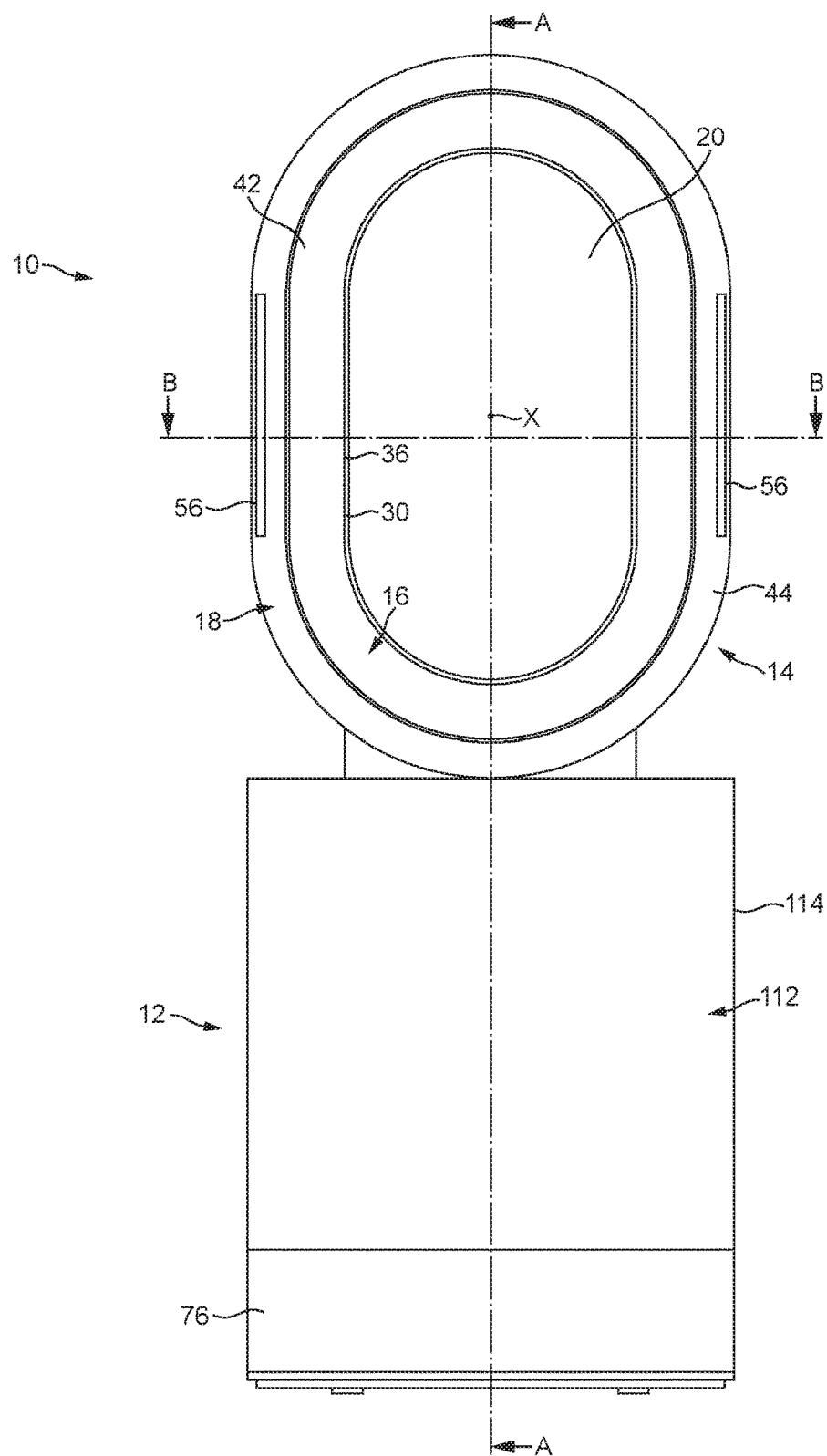
FIG. 1 is a front view of a fan assembly.
Figure 2:
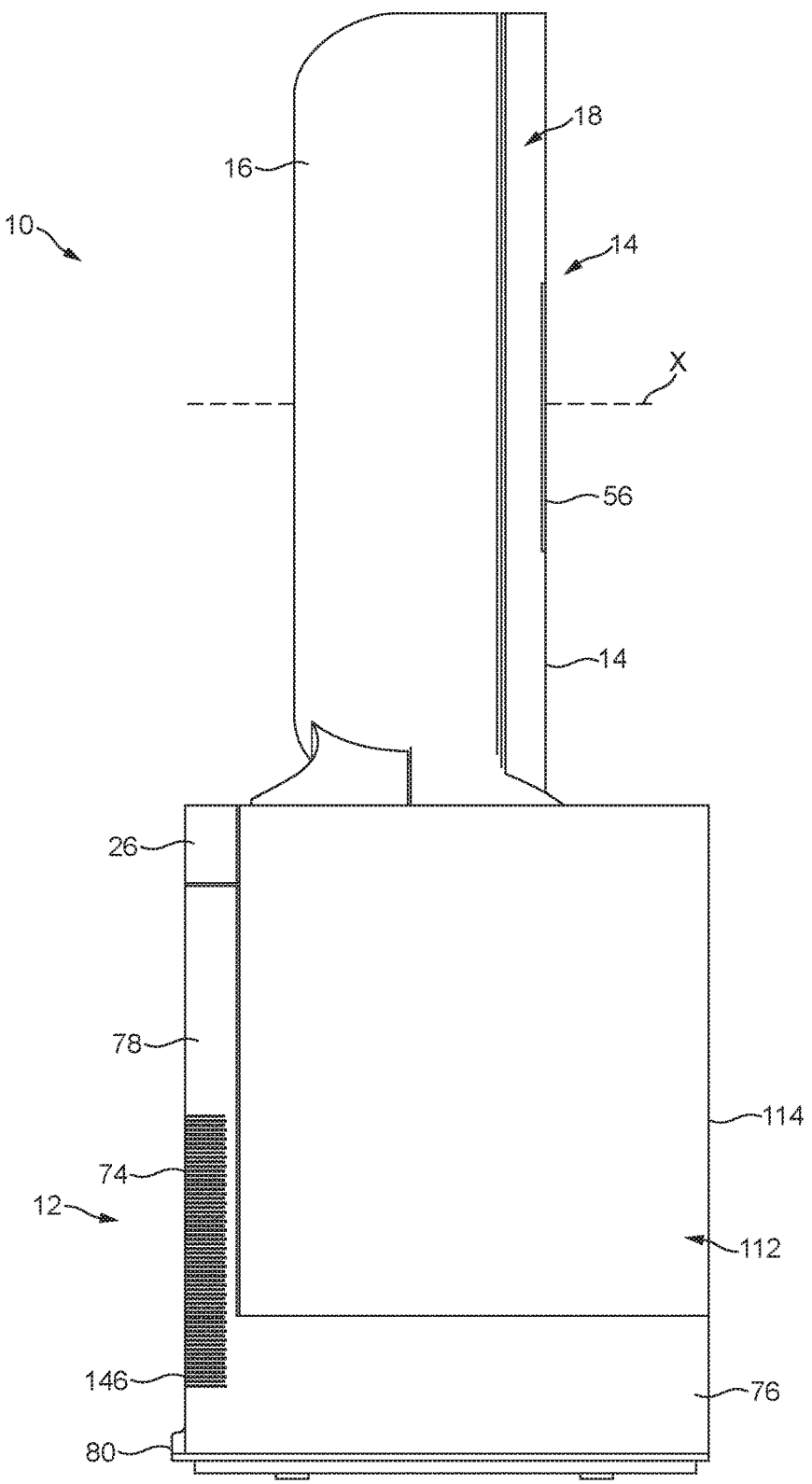
FIG. 2 is a side view of the fan assembly.
Figure 3:
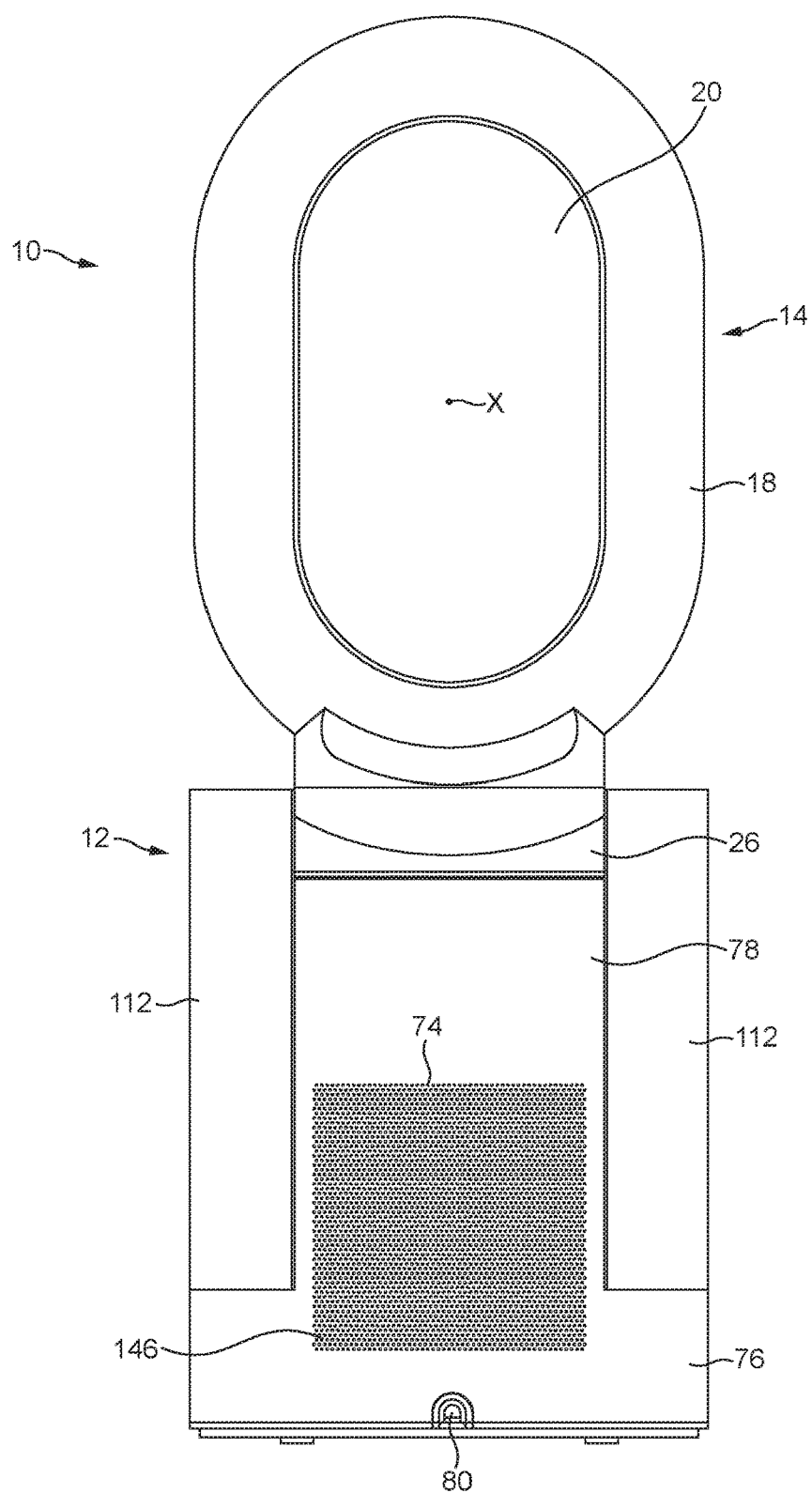
FIG. 3 is a rear view of the fan assembly.

FIGS. 1 to 3 are external views of a fan assembly 10. In overview, the fan assembly 10 comprises a body 12 comprising a plurality of air flow inlets through which air enters the fan assembly 10, and a nozzle 14 in the form of an annular casing mounted on the body 12, and which comprises a plurality of air outlets for emitting air from the fan assembly 10.

The nozzle 14 is arranged to emit, either simultaneously or separately, two different air flows. The nozzle 14 comprises a rear section 16 and a front section 18 connected to the rear section 16. Each section 16, 18 is annular in shape, and together the sections 16, 18 define a bore 20 of the nozzle 14. The bore 20 extends centrally through the nozzle 14, so that the center of each section 16, 18 is located on the axis X of the bore 20.

In this example, each section 16, 18 has a "racetrack" shape, in that each section 16, 18 comprises two, generally straight sections located on opposite sides of the bore 20, a curved upper section joining the upper ends of the straight sections and a curved lower section joining the lower ends of the straight sections. However, the sections 16, 18 may have any desired shape; for example the sections 16, 18 may be circular or oval. In this embodiment, the height of the nozzle 14 is greater than the width of the nozzle, but the nozzle 14 may be configured so that the width of the nozzle 14 is greater than the height of the nozzle.

Each section 16, 18 of the nozzle 14 defines a flow path along which a respective one of the air flows passes. In this embodiment, the rear section 16 of the nozzle 14 defines a first air flow path along which a first air flow passes through the nozzle 14, and the front section 18 of the nozzle 14 defines a second air flow path along which a second air flow passes through the nozzle 14.

Figure 4:
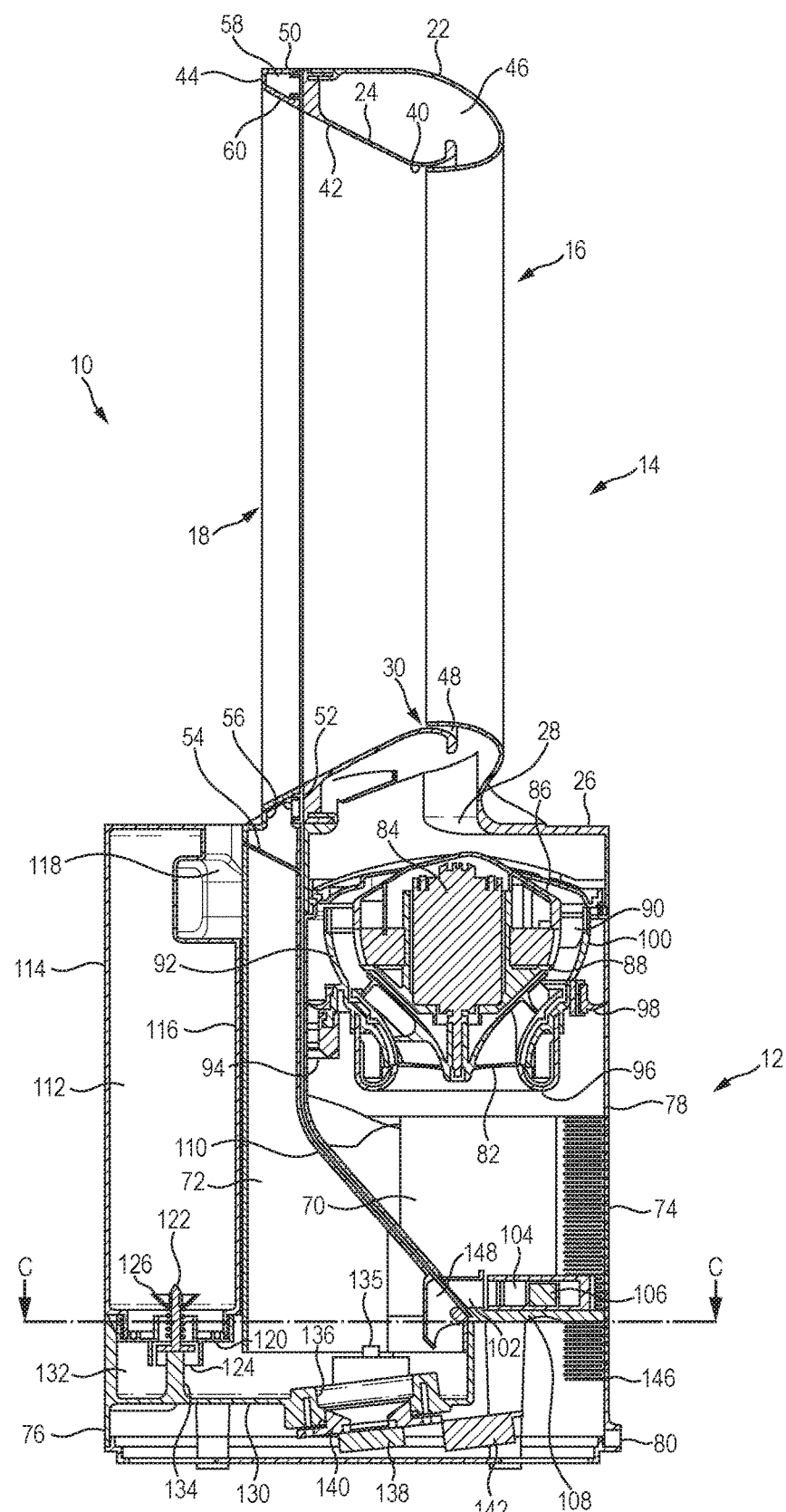
FIG. 4 is a side sectional view taken along line A-A in FIG. 1.
Figure 5:
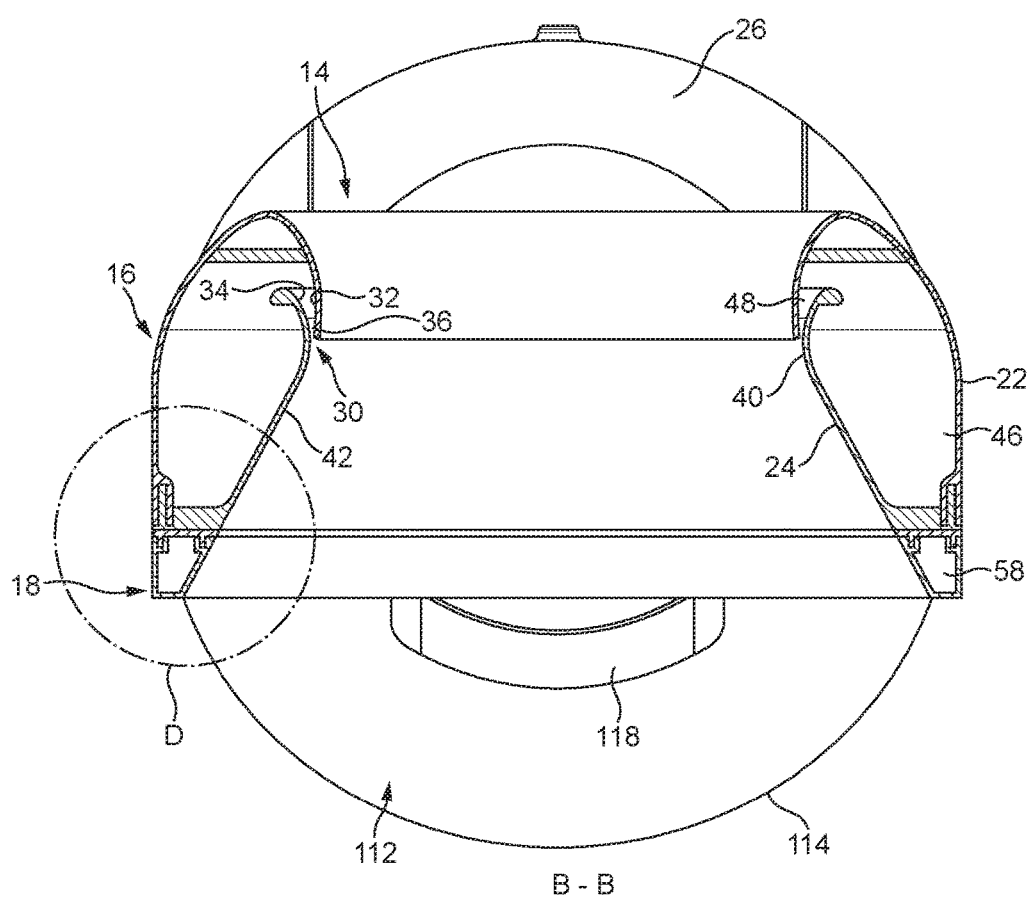
FIG. 5 is a top sectional view taken along line B-B in FIG. 1.
Figure 6:
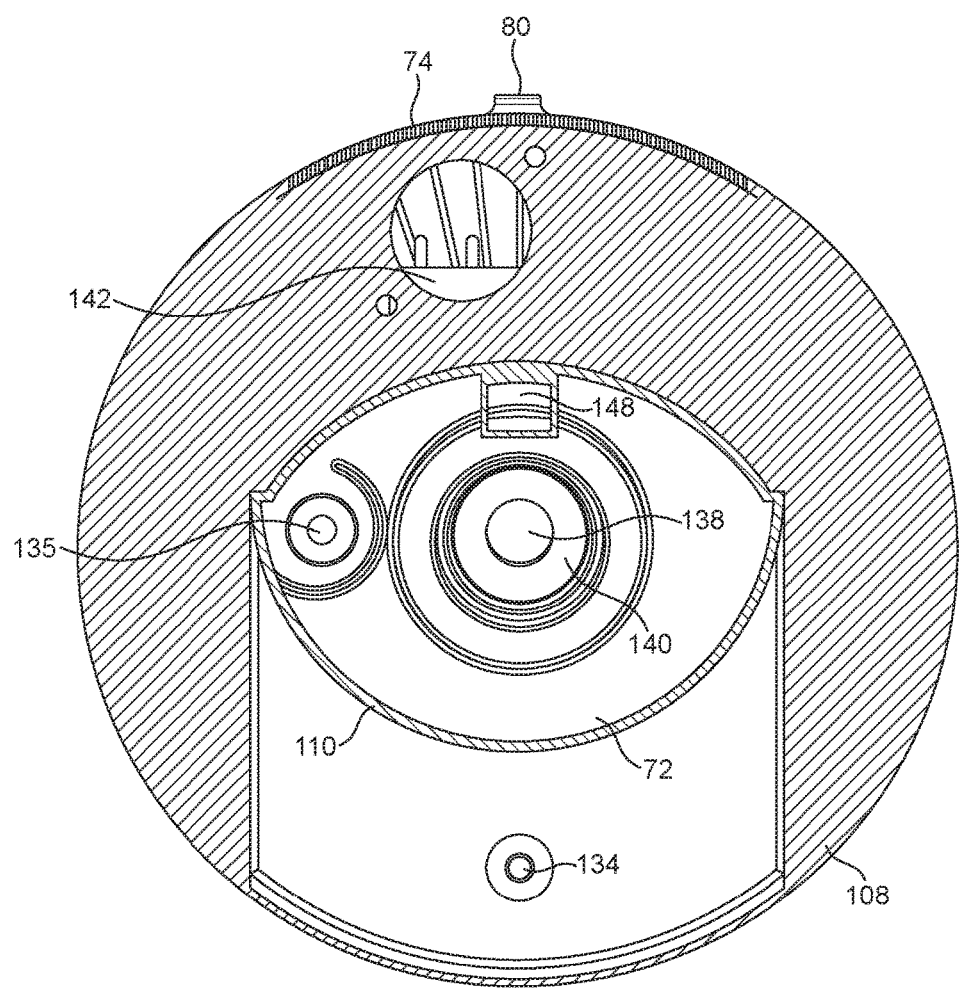
FIG. 6 is a top sectional view taken along line C-C in FIG. 4, with the water tank removed.
Figure 7:
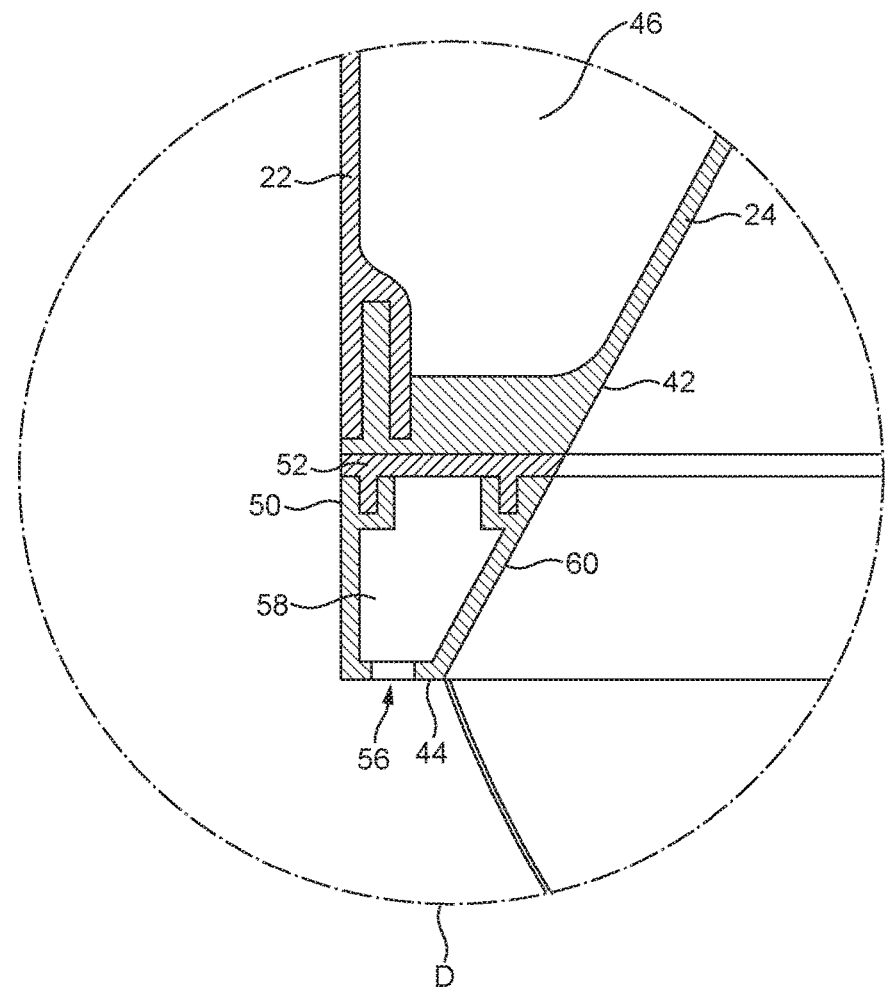
FIG. 7 is a close-up of area D indicated in FIG. 5.

With reference also to FIG. 4, the rear section 16 of the nozzle 14 comprises an annular outer casing section 22 connected to and extending about an annular inner casing section 24. Each casing section 22, 24 extends about the bore axis X. Each casing section may be formed from a plurality of connected parts, but in this embodiment each casing section 22, 24 is formed from a respective, single molded part. With reference also to FIGS. 5 and 7, during assembly the front end of the outer casing section 22 is connected to the front end of the inner casing section 24. An annular protrusion formed on the front end of the inner casing section 24 is inserted into an annular slot located at the front end of the outer casing section 22. The casing sections 22, 24 may be connected together using an adhesive introduced to the slot.

The outer casing section 22 comprises a base 26 which is connected to an open upper end of the body 12, and which defines a first air inlet 28 of the nozzle 14. The outer casing section 22 and the inner casing section 24 together define a first air outlet 30 of the nozzle 14. The first air outlet 30 is defined by overlapping, or facing, portions of the internal surface 32 of the outer casing section 22 and the external surface 34 of the inner casing section 24. The first air outlet 30 is in the form of an annular slot, which has a relatively constant width in the range from 0.5 to 5 mm about the bore axis X. In this example the first air outlet has a width of around 1 mm Spacers 36 may be spaced about the first air outlet 30 for urging apart the overlapping portions of the outer casing section 22 and the inner casing section 24 to control the width of the first air outlet 30. These spacers may be integral with either of the casing sections 22, 24.

The first air outlet 30 is arranged to emit air through a front part of the bore 20 of the nozzle 14. The first air outlet 30 is shaped to direct air over an external surface of the nozzle 14. In this embodiment, the external surface of the inner casing section 24 comprises a Coanda surface 40 over which the first air outlet 30 is arranged to direct the first air flow. The Coanda surface 40 is annular, and thus is continuous about the central axis X. The external surface of the inner casing section 24 also includes a diffuser portion 42 which tapers away from the axis X in a direction extending from the first air outlet 30 to the front end 44 of the nozzle 14.

The casing sections 22, 24 together define an annular first interior passage 46 for conveying the first air flow from the first air inlet 28 to the first air outlet 30. The first interior passage 46 is defined by the internal surface of the outer casing section 22 and the internal surface of the inner casing section 24. A tapering, annular mouth 48 of the rear section 16 of the nozzle 14 guides the first air flow to the first air outlet 30. The first air flow path through the nozzle 14 may therefore be considered to be formed from the first air inlet 28, the first interior passage 46, the mouth 48 and the first air outlet 30.

The front section 18 of the nozzle 14 comprises an annular front casing section 50 connected to an annular rear casing section 52. Each casing section 50, 52 extends about the bore axis X. Similar to the casing sections 22, 24, each casing section 50, 52 may be formed from a plurality of connected parts, but in this embodiment each casing section 50, 52 is formed from a respective, single molded part. With reference again to FIGS. 5 and 7, during assembly the front end of the rear casing section 52 is connected to the rear end of the front casing section 50. Annular protrusions formed on the front end of the rear casing section 52 are inserted into slots located at the rear end of the front casing section 50, and into which an adhesive is introduced. The rear casing section 52 is connected to the front end of the inner casing section 24 of the rear section 18 of the nozzle 14, for example also using an adhesive. If so desired, the rear casing section 52 may be omitted, with the front casing section 50 being connected directly to the front end of the inner casing section 24 of the rear section 18 of the nozzle 14.

The lower end of the front casing section 50 defines a second air inlet 54 of the nozzle 14. The front casing section 50 also define a plurality of second air outlets 56 of the nozzle 14. The second air outlets 56 are formed in the front end 44 of the nozzle 14, each on a respective side of the bore 20, for example by molding or machining. The second air outlets 56 are thus configured to emit the second air flow away from the nozzle 14. In this example, each second air outlet 56 is in the form of a slot having a relatively constant width in the range from 0.5 to 5 mm. In this example each second air outlet 56 has a width of around 1 mm. Alternatively, each second air outlet 56 may be in the form of a row of circular apertures or slots formed in the front end 44 of the nozzle 14.

The casing sections 50, 52 together define an annular second interior passage 58 for conveying the first air flow from the second air inlet 54 to the second air outlets 56. The second interior passage 58 is defined by the internal surfaces of the casing sections 50, 52. The second air flow path through the nozzle 14 may therefore be considered to be formed by the second air inlet 54, the interior passage 58 and the second air outlets 56.

The body 12 is generally cylindrical in shape. With reference to FIGS. 1 to 4, the body 12 comprises a first air passageway 70 for conveying the first air flow to the first air flow path through the nozzle 14, and a second air passageway 72 for conveying the second air flow to the second air flow path through the nozzle 14. Air is admitted into the body 12 by an air flow inlet 74. In this embodiment, the air flow inlet 74 comprises a plurality of apertures formed in a casing section of the body 12. Alternatively, the air flow inlet 74 may comprise one or more grilles or meshes mounted within windows formed in the casing section. The casing section of the body 12 comprises a generally cylindrical base 76 which has the same diameter as the body 12, and a tubular rear section 78 which is integral with the base 76 and has a curved outer surface which provides part of the outer surface of the rear of the body 12. The air flow inlet 74 is formed in the curved outer surface of the rear section 78 of the casing section. The base 26 of the rear section 16 of the nozzle 14 is mounted on an open upper end of the rear section 78 of the casing section.

The base 76 of the casing section may comprise a user interface of the fan assembly 10. The user interface is illustrated schematically in FIG. 8, and described in more detail below. A mains power cable (not shown) for supplying electrical power to the fan assembly 10 extends through an aperture 80 formed in the base 76.

The first air passageway 70 passes through the rear section 78 of the casing section, and houses a first user-operable system for generating a first air flow through the first air passageway 70. This first user-operable system comprises a first impeller 82, which in this embodiment is in the form of a mixed flow impeller. The first impeller 82 is connected to a rotary shaft extending outwardly from a first motor 84 for driving the first impeller 82. In this embodiment, the first motor 84 is a DC brushless motor having a speed which is variable by a control circuit in response to a speed selection by a user. The maximum speed of the first motor 84 is preferably in the range from 5,000 to 10,000 rpm. The first motor 84 is housed within a motor bucket comprising an upper portion 86 connected to a lower portion 88. The upper portion 88 of the motor bucket comprises a diffuser 90 in the form of a stationary disc having spiral blades. An annular foam silencing member may also be located within the motor bucket. The diffuser 90 is located directly beneath the first air inlet 28 of the nozzle 14.

The motor bucket is located within, and mounted on, a generally frusto-conical impeller housing 92. The impeller housing 92 is, in turn, mounted on a plurality of angularly spaced supports 94, in this example three supports, located within and connected to the rear section 78 of the body 12. An annular inlet member 96 is connected to the bottom of the impeller housing 92 for guiding the air flow into the impeller housing 92.

A flexible sealing member 98 is mounted on the impeller housing 92. The flexible sealing member prevents air from passing around the outer surface of the impeller housing to the inlet member 96. The sealing member 98 preferably comprises an annular lip seal, preferably formed from rubber. The sealing member 98 further comprises a guide portion for guiding an electrical cable 100 to the first motor 84.

The second air passageway 72 is arranged to receive air from the first air passageway 70. The second air passageway 72 is located adjacent to the first air passageway 70, and extends upwardly alongside the first air passageway 70 towards the nozzle 14. The second air passageway 72 comprises an air inlet 102 located at the lower end of the rear section 78 of the casing section. The air inlet 102 is located opposite the air flow inlet 74 of the body 12. A second user-operable system is provided for generating a second air flow through the second air passageway 72. This second user-operable system comprises a second impeller 104 and a second motor 106 for driving the second impeller 104. In this embodiment, the second impeller 104 is in the form of a radial flow impeller, and the second motor 106 is in the form of a DC motor. The second motor 106 has a fixed rotational speed, and may be activated by the same control circuit used to activate the first motor 84. The second user-operable system is preferably configured to generate a second air flow which has an air flow rate which is lower than the minimum air flow rate of the first air flow. For example, the flow rate of the second air flow is preferably in the range from 1 to 5 liters per second, whereas the minimum flow rate of the first air flow is preferably in the range from 10 to 20 liters per second.

The second impeller 104 and the second motor 106 are mounted on a lower internal wall 108 of the body 12. As illustrated in FIG. 4, the second impeller 104 and the second motor 106 may be located upstream from the air inlet 102, and so arranged to direct the second air flow through the air inlet 102 and into the second air passageway 72. However, the second impeller 104 and the second motor 106 may be located within the second air passageway 72. The air inlet 102 may be arranged to receive the second air flow directly from the air flow inlet 74 of the body 12; for example the air inlet 102 may abut the internal surface of the air flow inlet 74.

The body 12 of the fan assembly 10 comprises a central duct 110 for receiving the second air flow from the air inlet 102, and for conveying the second air flow to the second air inlet 54 of the nozzle 14. In this embodiment, the second user-operable system comprises a humidifying system for increasing the humidity of the second air flow before it enters the nozzle 14, and which is housed within the body 12 of the fan assembly 10. This embodiment of the fan assembly may thus be considered to provide a humidifying apparatus. The humidifying system comprises a water tank 112 removably mountable on the lower wall 108. As illustrated in FIGS. 1 to 3, the water tank 112 has an outer convex wall 114 which provides part of the outer cylindrical surface of the body 12, and an inner concave wall 116 which extends about the duct 110. The water tank 112 preferably has a capacity in the range from 2 to 4 liters. The upper surface of the water tank 112 is shaped to define a handle 118 to enable a user to lift the water tank 112 from the lower wall 108 using one hand.

The water tank 112 has a lower surface to which a spout 120 is removably connected, for example through co-operating threaded connections. In this example the water tank 112 is filled by removing the water tank 112 from the lower wall 108 and inverting the water tank 112 so that the spout 120 is projecting upwardly. The spout 120 is then unscrewed from the water tank 112 and water is introduced into the water tank 112 through an aperture exposed when the spout 120 is disconnected from the water tank 112. Once the water tank 112 has been filled, the user reconnects the spout 120 to the water tank 112, re-inverts the water tank 112 and replaces the water tank 112 on the lower wall 108. A spring-loaded valve 122 is located within the spout 120 for preventing leakage of water through a water outlet 124 of the spout 120 when the water tank 112 is re-inverted. The valve 122 is biased towards a position in which a skirt 126 of the valve 122 engages the upper surface of the spout 120 to prevent water entering the spout 120 from the water tank 112.

The lower wall 108 comprises a recessed portion 130 which defines a water reservoir 132 for receiving water from the water tank 112. A pin 134 extending upwardly from the recessed portion 130 of the lower wall 108 protrudes into the spout 120 when the water tank 112 is located on the lower wall 108. The pin 134 pushes the valve 122 upwardly to open the spout 120, thereby allowing water to pass under gravity into the water reservoir 132 from the water tank 112. This results in the water reservoir 132 becoming filled with water to a level which is substantially co-planar with the upper surface of the pin 134. A magnetic level sensor 135 is located within the water reservoir 132 for detecting the level of water within the water reservoir 132.

The recessed portion 130 of the lower wall 108 comprises an aperture 136 for exposing the surface of a piezoelectric transducer 138 located beneath the lower wall 108 for atomising water stored in the water reservoir 132. An annular metallic heat sink 140 is located between the lower wall 128 and the transducer 138 for transferring heat from the transducer 138 to a second heat sink 142. The second heat sink 142 is located adjacent a second set of apertures 144 formed in the outer surface of the casing section of the body 12 so that heat can be conveyed from the second heat sink 142 through the apertures 144. An annular sealing member 146 forms a water-tight seal between the transducer 138 and the heat sink 140. A drive circuit is located beneath the lower wall 128 for actuating ultrasonic vibration of the transducer 138 to atomize water within the water reservoir 132.

An inlet duct 148 is located to one side of the water reservoir 132. The inlet duct 148 is arranged to convey the second air flow into the second air passageway 72 at a level which is above the maximum level for water stored in the water reservoir 132 so that the air flow emitted from the inlet duct 148 passes over the surface of the water located in the water reservoir 132.

Figure 8:
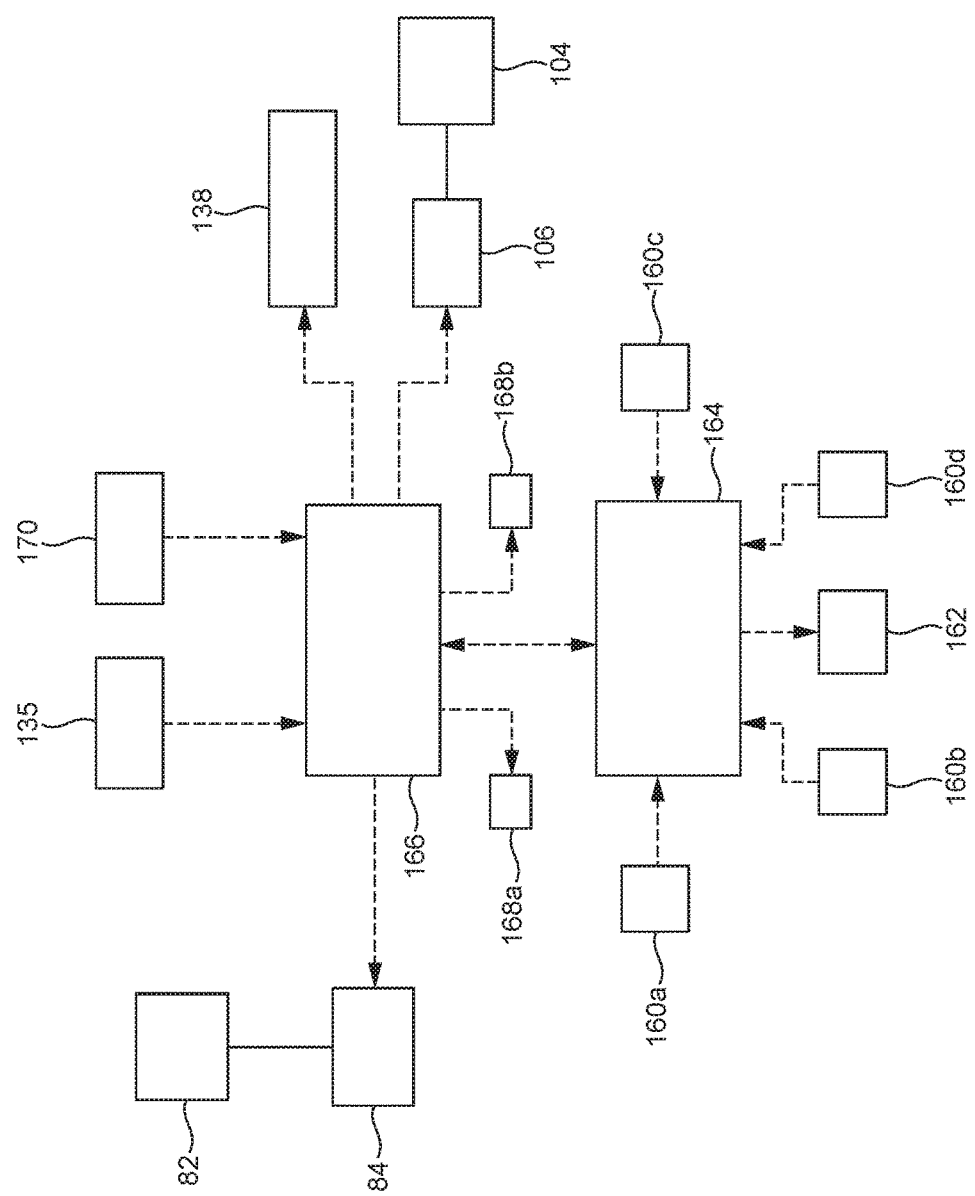
FIG. 8 is a schematic illustration of a control system of the fan assembly.

A user interface for controlling the operation of the fan assembly is located on the side wall of the casing section of the body 12. FIG. 8 illustrates schematically a control system for the fan assembly 10, which includes this user interface and other electrical components of the fan assembly 10. In this example, the user interface comprises a plurality of user-operable buttons 160a, 160b, 160c, 160d and a display 162. The first button 160a is used to activate and deactivate the first motor 84, and the second button 160b is used to set the speed of the first motor 84, and thus the rotational speed of the first impeller 82. The third button 160c is used to activate and deactivate the second motor 106. The fourth button 160d is used to set a desired level for the relative humidity of the environment in which the fan assembly 10 is located, such as a room, office or other domestic environment. For example, the desired relative humidity level may be selected within a range from 30 to 80% at 20° C. through repeated pressing of the fourth button 160d. A display 162 provides an indication of the currently selected relative humidity level.

The user interface further comprises a user interface circuit 164 which outputs control signals to a drive circuit 166 upon depression of one of the buttons, and which receives control signals output by the drive circuit 166. The user interface may also comprise one or more LEDs for providing a visual alert depending on a status of the humidifying system. For example, a first LED 168a may be illuminated by the drive circuit 166 indicating that the water tank 112 has become depleted, as indicated by a signal received by the drive circuit 166 from the level sensor 135.

A humidity sensor 170 is also provided for detecting the relative humidity of air in the external environment, and for supplying a signal indicative of the detected relative humidity to the drive circuit 166. In this example the humidity sensor 170 may be located immediately behind the air flow inlet 74 to detect the relative humidity of the air flow drawn into the fan assembly 10. The user interface may comprise a second LED 168b which is illuminated by the drive circuit 166 when an output from the humidity sensor 170 indicates that the relative humidity of the air flow entering the fan assembly 10 is at or above the desired relative humidity level set by the user.

To operate the fan assembly 10, the user depresses the first button 160a, in response to which the drive circuit 166 activates the first motor 84 to rotate the first impeller 82. The rotation of the first impeller 82 causes air to be drawn into the body 12 through the air flow inlet 74. An air flow passes through the first air passageway 70 to the first air inlet 28 of the nozzle 14, and enters the first interior passage 46 within the rear section 16 of the nozzle 14. At the base of the first interior passage 46, the air flow is divided into two air streams which pass in opposite directions around the bore 20 of the nozzle 14. As the air streams pass through the first interior passage 46, air enters the mouth 48 of the nozzle 14. The air flow into the mouth 48 is preferably substantially even about the bore 20 of the nozzle 14. The mouth 48 guides the air flow towards the first air outlet 30 of the nozzle 14, from where it is emitted from the fan assembly 10.

The air flow emitted from the first air outlet 30 is directed over the Coanda surface 40 of the nozzle 14, causing a secondary air flow to be generated by the entrainment of air from the external environment, specifically from the region around the first air outlet 30 and from around the rear of the nozzle 14. This secondary air flow passes through the bore 20 of the nozzle 14, where it combines with the air flow emitted from the nozzle 14.

When the first motor 84 is operating, the user may increase the humidity of the air flow emitted from the fan assembly 10 by depressing the third button 160c. In response to this, the drive circuit 166 activates the second motor 106 to rotate the second impeller 104. As a result, air is drawn from the first air passageway 70 by the rotating second impeller 104 to create a second air flow within the second air passageway 72. The air flow rate of the second air flow generated by the rotating second impeller 104 is lower than that generated by the rotating first impeller 82 so that a first air flow continues to pass through the first air passageway 70 to the first air inlet 28 of the nozzle 14.

Simultaneous with the actuation of the second motor 106, the drive circuit 166 actuates the vibration of the transducer 138, preferably at a frequency in the range from 1 to 2 MHz, to atomize water present within the water reservoir 132. This creates airborne water droplets above the water located within the water reservoir 132. As water within the water reservoir 132 is atomized, the water reservoir 132 is constantly replenished with water from the water tank 112, so that the level of water within the water reservoir 132 remains substantially constant while the level of water within the water tank 112 gradually falls.

With rotation of the second impeller 104, the second air flow passes through the inlet duct 148 and is emitted directly over the water located in the water reservoir 132, causing airborne water droplets to become entrained within the second air flow. The—now moist—second air flow passes upwardly through the central duct 110, and the second air passageway 72 to the second air inlet 54 of the nozzle 14, and enters the second interior passage 58 within the front section 18 of the nozzle 14. At the base of the second interior passage 58, the second air flow is divided into two air streams which pass in opposite directions around the bore 20 of the nozzle 14. As the air streams pass through the second interior passage 58, each air stream is emitted from a respective one of the second air outlets 56 located in the front end 44 of the nozzle 14. The emitted second air flow is conveyed away from the fan assembly 10 within the air flow generated through the emission of the first air flow from the nozzle 14, thereby enabling a humid air current to be experienced rapidly at a distance of several meters from the fan assembly 10.

Provided that the third button 160c has not been subsequently depressed, the moist air flow is emitted from the front section 18 of the nozzle until the relative humidity of the air flow entering the fan assembly, as detected by the humidity sensor 170, is 1% at 20° C. higher than the relative humidity level selected by the user using the fourth button 160d. The emission of the moistened air flow from the front section 18 of the nozzle 14 is then terminated by the drive circuit 166, through terminating the supply of actuating signals to the transducer 138. Optionally, the second motor 106 may also be stopped so that no second air flow is emitted from the front section 18 of the nozzle 14. However, when the humidity sensor 170 is located in close proximity to the second motor 106 it is preferred that the second motor 106 is operated continually to avoid undesirable temperature fluctuation in the local environment of the humidity sensor 170. When the humidity sensor 170 is located outside the fan assembly 10, for example, the second motor 106 may also be stopped when the relative humidity of the air of the environment local to the humidity sensor 170 is 1% at 20° C. higher than the relative humidity level selected by the user.

As a result of the termination of the emission of a moist air flow from the fan assembly 10, the relative humidity detected by the humidity sensor 170 will begin to fall. Once the relative humidity of the air of the environment local to the humidity sensor 170 has fallen to 1% at 20° C. below the relative humidity level selected by the user, the drive circuit 166 outputs actuating signals to the transducer 138 to re-start the emission of a moist air flow from the front section 18 of the nozzle 14. As before, the moist air flow is emitted from the front section 18 of the nozzle 14 until the relative humidity detected by the humidity sensor 170 is 1% at 20° C. higher than the relative humidity level selected by the user, at which point the actuation of the transducer 138 is terminated.

This actuation sequence of the transducer 138 for maintaining the detected humidity level around the level selected by the user continues until one of the buttons 160a, 160c is depressed or until a signal is received from the level sensor 135 indicating that the level of water within the water reservoir 132 has fallen by the minimum level. If the button 160a is depressed, the drive circuit 166 deactivates both motors 84, 106 to switch off the fan assembly 10.

The invention claimed is:

1. A humidifying apparatus comprising:
a nozzle having at least one first air inlet, at least one first air outlet, a first interior passage for conveying air from said at least one first air inlet to said at least one first air outlet, at least one second air inlet, at least one second air outlet, and a second interior passage for conveying air from said at least one second air inlet to said at least one second air outlet, the nozzle defining a bore through which air from outside the humidifying apparatus is drawn by air emitted from the nozzle; and
a body on which the nozzle is mounted, the body comprising an air flow generator that generates a first air flow through the first interior passage and a second air flow through the second interior passage, a first air passageway for conveying the first air flow to said at least one first air inlet of the nozzle, a second air passageway for conveying the second air flow to said at least one second air inlet of the nozzle, and a humidifier that humidifies the second air flow before it enters the second interior passage.

2. The humidifying apparatus of claim 1, wherein said at least one first air outlet is located behind said at least one second air outlet.

3. The humidifying apparatus of claim 2, wherein said at least one first air outlet of the nozzle extends about the bore of the nozzle.

4. The humidifying apparatus of claim 3, wherein said air outlet is continuous.

5. The humidifying apparatus of claim 1, wherein said at least one first air outlet is arranged to emit the first air flow through at least a front part of the bore.

6. The humidifying apparatus of claim 5, wherein said at least one first air outlet is arranged to emit the first air flow over a surface defining the front part of the bore.

7. The humidifying apparatus of claim 1, wherein the body comprises an air flow inlet for admitting at least the first air flow into the humidifying apparatus from outside the body.

8. The humidifying apparatus of claim 7, wherein the air flow inlet comprises a plurality of apertures.

9. The humidifying apparatus of claim 1, wherein the second air passageway is arranged to receive air from the first air passageway.

10. The humidifying apparatus of claim 1, wherein the air flow generating system comprises an impeller and a motor for driving the impeller.

11. The humidifying apparatus of claim 1, wherein the first interior passage is isolated from the second interior passage.

12. The humidifying apparatus of claim 1, wherein the humidifying system comprises a water reservoir and a transducer for atomizing water in the water reservoir.

13. The humidifying apparatus of claim 12, wherein the body comprises a water tank for supplying water to the water reservoir.

14. The humidifying apparatus of claim 13, wherein the body comprises a base housing said air flow generating system, and wherein the water tank is mounted on the base.

* * * * *